(12) United States Patent
Yang et al.

(10) Patent No.: US 7,435,343 B2
(45) Date of Patent: Oct. 14, 2008

(54) VIBRATION FILTER

(75) Inventors: Fong-Ru Yang, Hsinchu (TW); Yi-Fu Chen, Renwu Township, Kaohsiung County (TW); Sheng-An Lin, Beipu Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 189 days.

(21) Appl. No.: 11/260,460

(22) Filed: Oct. 28, 2005

(65) Prior Publication Data

US 2006/0138037 A1 Jun. 29, 2006

(30) Foreign Application Priority Data

Dec. 29, 2004 (TW) .............................. 93141110 A

(51) Int. Cl.
*B01D 35/20* (2006.01)
*C02F 1/48* (2006.01)

(52) U.S. Cl. .................. 210/223; 210/321.6; 210/384; 210/388

(58) Field of Classification Search .................. 210/223, 210/321.6, 384, 388
See application file for complete search history.

(56) References Cited

U.S. PATENT DOCUMENTS

| | | | | |
|---|---|---|---|---|
| 3,477,948 A | * | 11/1969 | Inoue | 210/695 |
| 5,014,564 A | * | 5/1991 | Culkin | 74/61 |
| 6,706,180 B2 | * | 3/2004 | Kirker et al. | 210/388 |

* cited by examiner

*Primary Examiner*—David A Reifsnyder
(74) *Attorney, Agent, or Firm*—Bacon & Thomas PLLC

(57) ABSTRACT

A vibration filter that eliminates the problems of polarization, blockage and fouling is disclosed to include a separation membrane for removing solid matter in a fluid, a base, a magnetic field generator controllable to provide a variable magnetic flux, and vibrators made by a magnetostrictive material and arranged in an array on the base and kept in close contact with the separation membrane for vibrating the separation membrane upon generation of a variable magnetic flux by the magnetic field generator.

13 Claims, 3 Drawing Sheets

Test environment parameters

Longitudinal axis: Penetrating flow value (Unit: $L/(h*m^2)$)

Carbon concentration in waste fluid: 0.4wt%

Temperature condition: 30°C

Penetration pressure: $2.5 kg/cm^2$

Hole of separation membrane: 1.0μm

VIBRATION FILTER

BACKGROUND OF THE INVENTION

1. Field of the Invention

The present invention relates to a filter and more particularly to a vibration filter, which vibrates a separation membrane by means of causing a dimension change of a magnetostrictive material.

2. Description of Related Art

Filtration is an important step in the manufacturing processes of biochemical, medical, biotechnological, and electronic industries. For example, during the fabrication of a chemical product, it is necessary to filtrate the concentration/water source.

During the filtering process, solid waste matter may be accumulated in the filter element. Such accumulation of solid waste matter in the filter element may cause polarization, resulting in blockage or fouling of the filter element.

When a blockage or foiling problem of the filter element occurs, the user may remove the waste solid matter from the filter element by means of reverse washing. However, reverse washing takes too much time and cost, and gives little help to improvement of filtering effect or preventing accumulation of solid waste matter in the filter element.

There is disclosed a drive mechanism for a body which is capable of inducing a vibration force on the body of very high magnitude by utilizing relatively simple motor means (see U.S. Pat. No. 5,014,564). This drive mechanism is expensive, and its maintenance cost is also high. Further, this drive mechanism does not provide a significant improvement on the filtering effect.

SUMMARY OF THE INVENTION

The present invention has been accomplished under the circumstances in view. It is therefore the main object of the present invention to provide a vibration filter, which uses a variable magnetic flux to cause vibrators to vibrate a separation membrane, thereby preventing accumulation of solid matters in the separation membrane and improving the filtering effect of the separation membrane.

According to the present invention, the vibration filter uses a separation membrane to filter a fluid, the vibration filter comprising: a base a magnetic field generator and at least one vibrator. The base has at least one through hole. The magnetic field generator is mounted on the base at one side and adapted to provide a variable magnetic flux. The vibrator is made of magnetostrictive material and mounted on the base for vibrating the separation membrane upon generation of a variable magnetic flux by the magnetic field generator.

The magnetic field generator is preferably an electromagnet. Alternatively, the magnetic field generator can be an electric unit of power.

Further, a number of vibrators may be used. In this case, the vibrators can be arranged on the base in an M*N array where M and N are integral numbers greater than 1. Alternatively, the vibrators can be arranged on the base in the form of a circle.

The vibration filter further comprises a guide pipe for guiding the fluid through the separation membrane for filtration.

Further, the vibrators can be of any of a variety of forms, but preferably is in the form of a cubic block member.

DETAILED DESCRIPTION OF THE PREFERRED EMBODIMENT

Figure 1:
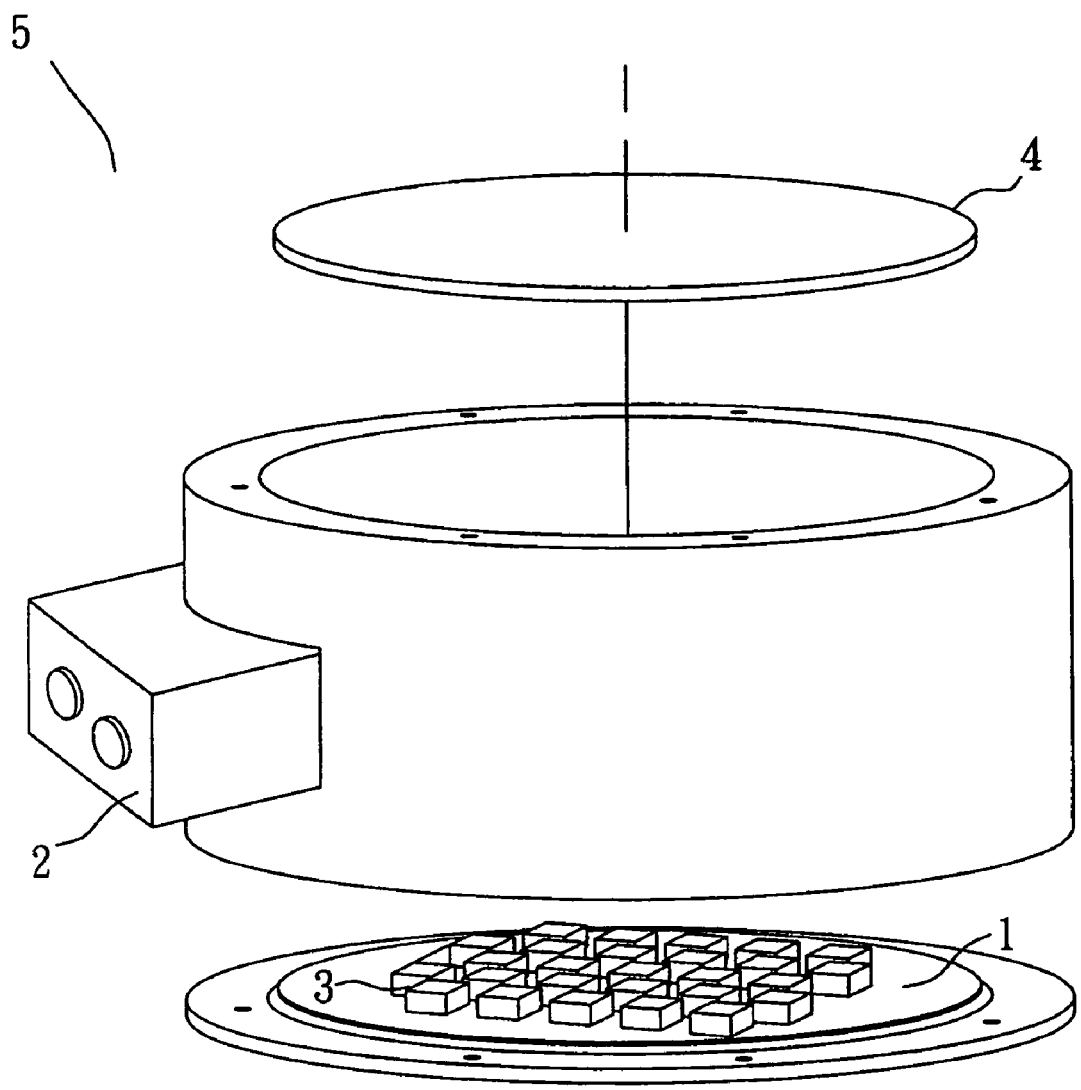
FIG. 1 is an exploded view of a vibration filter according to the present invention.

Referring to FIG. 1, a vibration filter 5 in accordance with the present invention is shown comprising a base 1, a magnetic field generator 2, at least one vibrator 3, and a separation membrane 4, wherein the base 1 has at least one through hole.

The magnetic field generator 2 is provided at one lateral side relative to the base 1, and adapted to provide a variable magnetic flux. The magnetic field generator 2 can be a frequency-adjustable magnetic force-adjustable electromagnet or electric unit of power adapted to provide a magnetic flux at different frequency in directions.

According to this embodiment, the vibrators 3 are cubic block members made by magnetostrictive materials (for example, erbium-dysprosium-iron alloy), and mounted on the top side of the base 1. The number of the vibrators 3 may be adjusted subject to different requirements. The vibrators 3 can be arranged on the base 1 in, for example, an M*N array where M and N are integral numbers greater than one. Alternatively, the vibrators 3 can be arranged on the base 1 in the form of a circle or an irregular arrangement without blocking the holes in the base 1.

The separation membrane 4 is a Teflon™ membrane having through holes of caliber within 1.0 μm, and firmly held in close contact with the vibrators 3 for removing solid matters in fluid passing there through.

The operation of the vibration filter 5 is outlined hereinafter. When a fluid is guided from a fluid pipe into the vibration filter 5, the magnetic field generator 2 is started to provide a variable magnetic flux, and at the same time the vibrators 3 are driven to vibrate the separation membrane 4, thereby preventing accumulation of solid matters in the separation membrane 4. Therefore, the invention effectively eliminates the problem of polarization, thus preventing blockage or fouling of the separation membrane 4.

Figure 2:
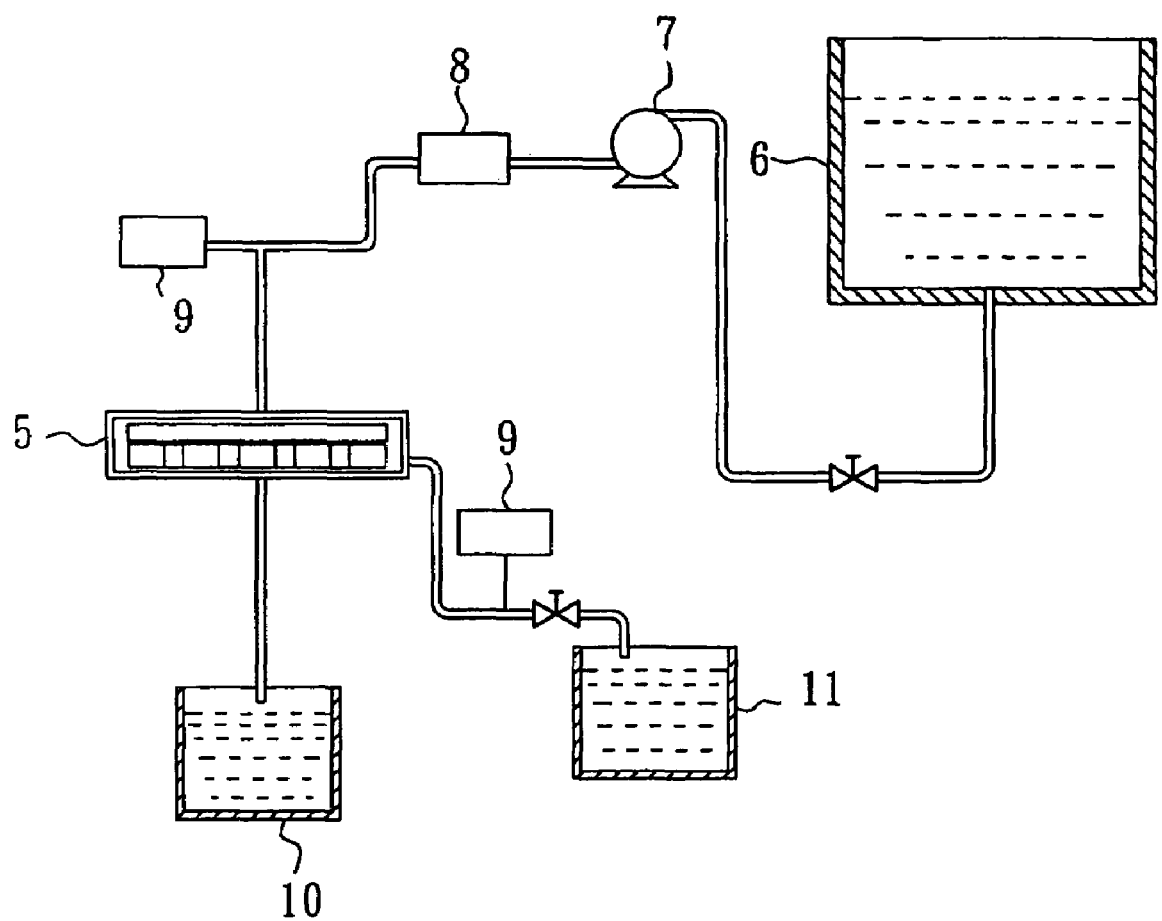
FIG. 2 is a system block diagram of a water treatment system showing an application example of the vibration filter.

FIG. 2 shows an application example of the present invention in a filter system. As illustrated, 30° C. waste fluid that contains 0.4 wt % carbon was pumped by a pump P out of a waste fluid tank through a flowchart controller 8 and a water pressure gauge 9 into a vibration filter 5 that is constructed according to the present invention.

The flowchart controller 8 and the waste pressure gauge 9 were to control the velocity of the waste fluid at 2.5 kg/cm$^2$. When the waste fluid was passed through the vibration filter 5, carbon was removed from the filtrate and gathered in a storage tank 10 and the filtrate was guided through another water pressure gauge 9 into a fluid tank 11. It vibration filter 5 showed a stable status (the flowchart of the filtrate remained unchanged for 30 minutes) after the filter system had undergone a 3-hour filtration operation. At this stable status, the flowchart of the filtrate was measured to be 440 L/(h*m$^2$).

Thereafter, under the same operation conditions, a secondary test was made. At this time, the magnetic field generator 2 of the vibration filter 5 was started to generate a variable magnetic flux, causing the vibrators 3 to vibrate the separation membrane 4 of the vibration filter 5. (See also FIG. 1).

After a 3-hour filtration operation to reach a stable status, the flowchart of the filtrate was measured to be 900 L/(h*m$^2$).

Figure 3:
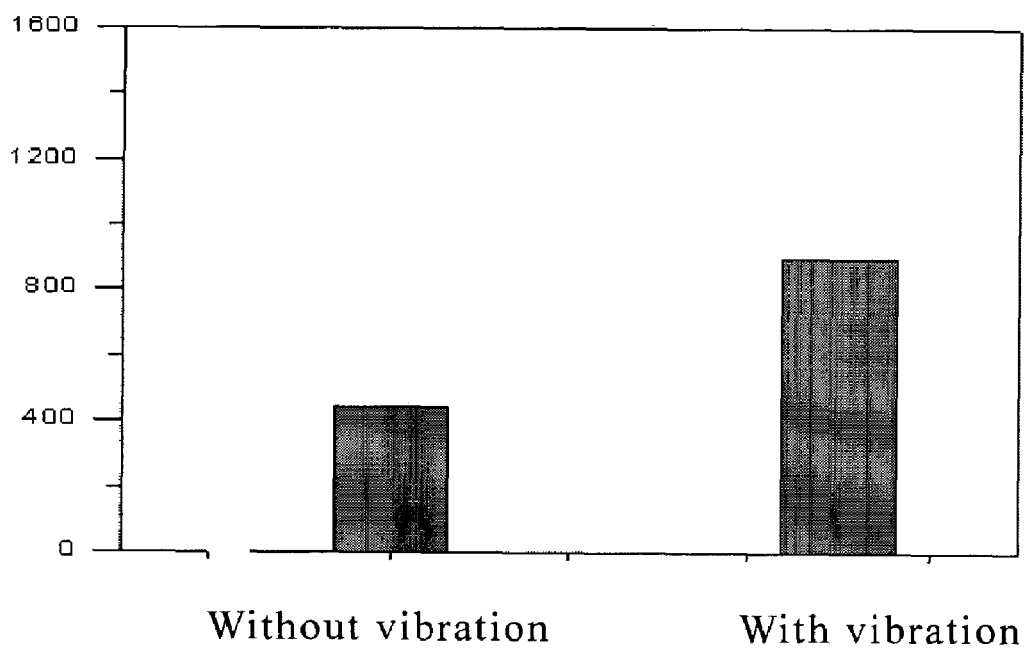
FIG. 3 is a flowchart chart showing the flowchart of the filtrate through the vibration filter under a vibrator enabled condition and a vibrator disabled condition.

Referring to FIG. 3, as indicated above, the flowchart of the filtrate was measured to be 440 L/(h*m$^2$) under the condition that the magnetic field generator of the vibration filter was disabled, or 900 L/(h*m$^2$) under the condition that the magnetic field generator of the vibration was enabled. These tests show a great improvement of the present invention on the flowchart of the filter.

Although the present invention has been explained in relation to its preferred embodiment, it is to be understood that many other possible modifications and variations can be made without departing from the spirit and scope of the invention as hereinafter claimed.

What is claimed is:

1. A vibration filter of the type using a separation membrane to filter a fluid, the vibration filter comprising:
   a base, said base having at least one through hole;
   a magnetic field generator mounted on said base at one side and adapted to provide a variable magnetic flux;
   a separation membrane; and
   at least one vibrator made by magnetostrictive material and mounted on said base for vibrating the separation membrane of the vibration filter upon generation of a variable magnetic flux by said magnetic field generator.

2. The vibration filter as claimed in claim 1, wherein said magnetostrictive material is erbium-dysprosium-iron alloy.

3. The vibration filter as claimed in claim 1, wherein said magnetic field generator is an electromagnet.

4. The vibration filter as claimed in claim 1, wherein said magnetic field generator is an electric unit of power.

5. The vibration filter as claimed in claim 1, wherein said at least one vibrator includes a plurality of vibrators arranged on said base in an M*N array where M and N are integral numbers greater than 1.

6. The vibration filter as claimed in claim 1, wherein said at least one vibrator includes a plurality of vibrators arranged on said base in the form of a circle.

7. The vibration filter as claimed in claim 1, wherein said separation membrane is kept in close contact with said at least one vibrator and adapted to remove solid matter in a fluid.

8. The vibration filter as claimed in claim 1, wherein each said vibrator is a cubic block member.

9. The vibration filter as claimed in claim 1, wherein the separation membrane is a polytetrafluoroethylene (PTFE) membrane having through holes of caliber within 1.0 μm, and firmly held in close contact with the vibrators for removing solid matters in fluid passing there through.

10. The vibration filter as claimed in claim 9, wherein said magnetostrictive material is erbium-dysprosium-iron alloy.

11. The vibration filter as claimed in claim 10, wherein said magnetic field generator is an electric unit of power.

12. The vibration filter as claimed in claim 9, wherein said magnetic field generator is an electromagnet.

13. The vibration filter as claimed in claim 9, wherein said at least one vibrator includes a plurality of vibrators arranged on said base in an M*N array where M and N are integral numbers greater than 1.

* * * * *